W. J. MUNDY.
PICK, DRILL, AND THE LIKE.
APPLICATION FILED JAN. 26, 1915.
1,159,326.
Patented Nov. 2, 1915.
2 SHEETS—SHEET 2.
Fig. 5.
Fig. 6.
Fig. 7.
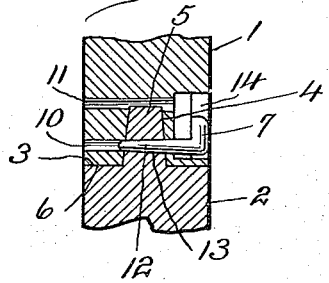
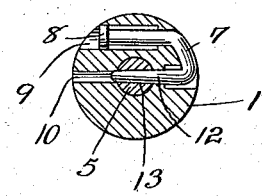
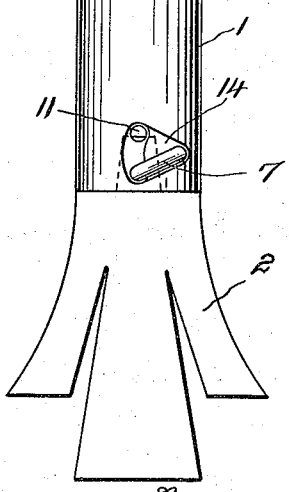
Witnesses
T. T. Britt
Reed Stanton
Inventor
William J. Mundy
By
Attorneys

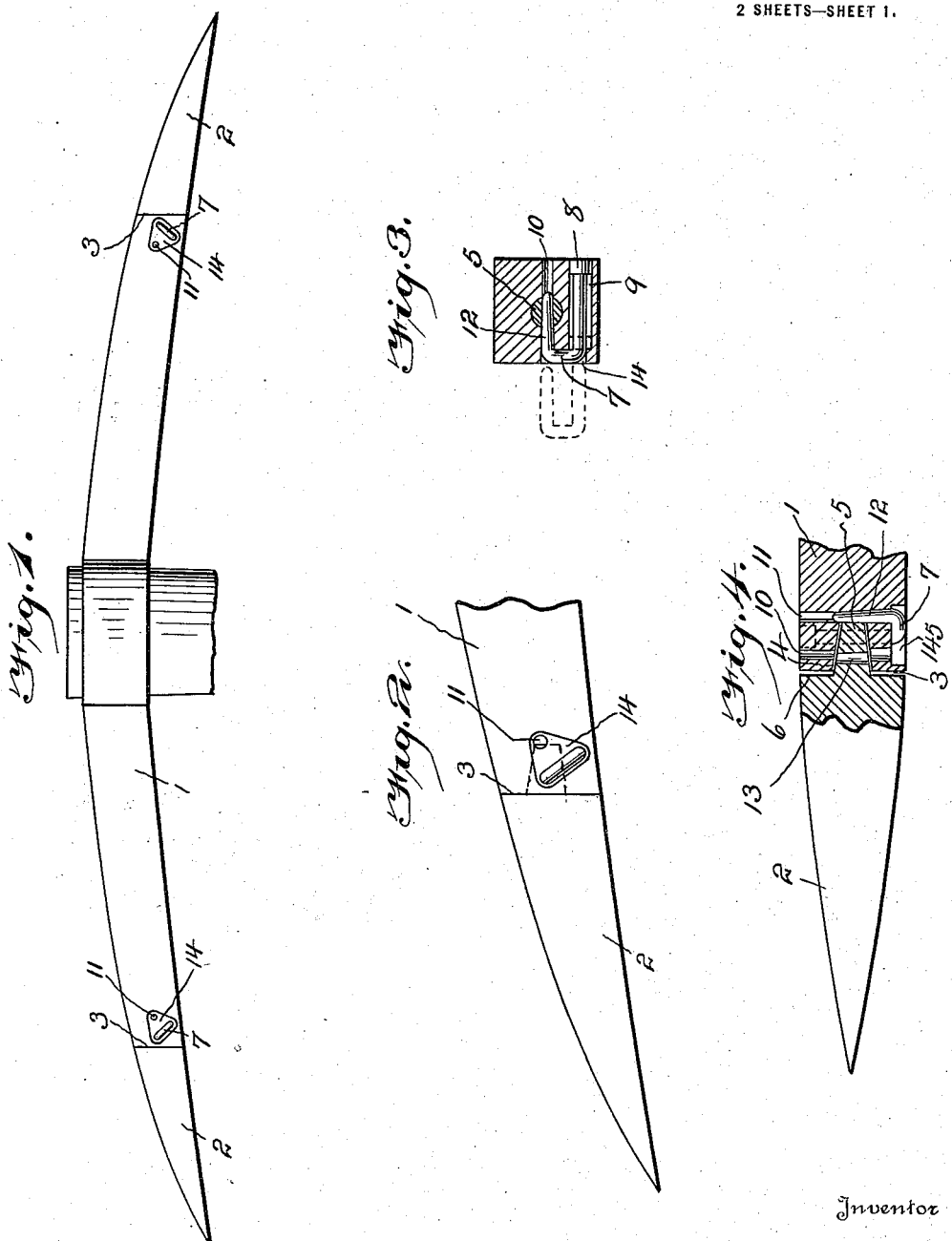

UNITED STATES PATENT OFFICE.

WILLIAM J. MUNDY, OF SHENANDOAH, PENNSYLVANIA, ASSIGNOR OF ONE-THIRD TO JOHN W. BRESLIN AND ONE-THIRD TO JAMES J. BRESLIN, BOTH OF SHENANDOAH, PENNSYLVANIA.

PICK, DRILL, AND THE LIKE.

1,159,326.  Specification of Letters Patent.  Patented Nov. 2, 1915.

Application filed January 26, 1915. Serial No. 4,456.

*To all whom it may concern:*

Be it known that I, WILLIAM J. MUNDY, a citizen of the United States, residing at Shenandoah, in the county of Schuylkill and State of Pennsylvania, have invented certain new and useful Improvements in Picks, Drills, and the like; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to picks, drills and the like and has for its object to provide a novel construction for removably securing pick points, drill points, and the like to tools and implements of this character, in such manner that points of different and varying shapes and contours can be quickly applied and secured to implements of this class for different kinds of work, which points can be quickly removed from the implement.

With these objects in view the invention consists in the novel construction and arrangement of parts for effecting the quick and ready application and retention of the points to the implements, and for effecting quick and ready disengagement of the point from the implement without scarring and injuring either the implements or the points, or in any way affecting their use and durability.

The invention further consists in certain details of construction and combinations of parts, all of which will be first fully described and after which specifically pointed out in the appended claim.

Referring to the accompanying drawings Figure 1 is an elevation of a pick constructed in accordance with this invention, the handle thereof being broken away. Fig. 2 is an enlarged fragmentary view of one end of the pick. Fig. 3 is a vertical transverse sectional view taken on line 3—3 of Fig. 2. Fig. 4 is a longitudinal sectional view through the engaging end of the pick point, and the pick shank or body. Fig. 5 is a fragmentary view illustrating a drill shank with drill point in position thereon. Fig. 6 is a longitudinal sectional view illustrating the drill point and drill shank and the fastening or retaining means, and Fig. 7 is a transverse sectional view taken on line 7—7 of Fig. 5.

Like numerals of reference indicate the same parts throughout the several figures in which—

1 indicates a pick having the removable points 2 which may be of any form or contour as may be required for the work to be accomplished. The shank or body 1 of the pick is faced off at 3 at each end and is provided with a tapered recess 4 at each end to receive a tapered lug 5 formed on the pick point 2, the said pick point 2 being faced at 6 to conform to the faced end 3 of the pick shank or body 1.

Slidably arranged in the pick shank or body 1 and transversely thereof is what I term a staple 7 which is of suitable material and sufficiently heavy and rigid to perform the functions for which it is intended, the said staple 7 being provided with a head 8 which lies within a transverse hole 9 through the shank or body 1 of the pick. Associated with said staple 7 are two transverse holes or bores 10 and 11, either of which is adapted to receive the tapered short end 12 of the staple 7 as will be hereinafter described.

Referring now to Figs. 3 and 4 it will be seen that the tapered lug 5 of the point 2 is provided with a transverse and tapered opening or bore 13, which is adapted to register with the transverse opening or bore 10 in the pick shank or body 1, while it will be seen particularly from Figs. 2 and 4 that the extreme inner end of the tapered lug 5 of the pick 2 extends within the transverse bore or opening 11 in the shank or body 1 of the pick, and it will be seen from the accompanying drawing particularly from Figs. 3 and 4 that a slight recess 14 is provided in the shank or body 1 of the pick, so that the staple 7 when in operative position as shown in Fig. 3 will not extend beyond the normal side of the pick shank or body to present an obstruction and to interfere with the proper action of the pick.

The foregoing description is equally applicable to Figs. 5, 6 and 7 which illustrates a drill shank and its point, and the foregoing numerals of reference have been applied to said Figs. 5, 6 and 7 as applying to the parts thereon agreeing with the parts of the pick, just described.

In operation the staple 7 is withdrawn or driven into open position shown in dotted lines in Fig. 3. The pick point is inserted with its tapered lug 5 within the tapered recess 4 in the end of the pick shank or body 1. The staple 7 is then turned until its short tapered end 12 is in line with the transverse perforation 10 in the pick shank or body 1 and is driven into said transverse perforation 10, which operation causes it to pass through the tapered opening 13 in the tapered lug 5 of the pick point, in the manner as is shown in Fig. 3. By this arrangement the pick point is rigidly held in engagement with the pick shank or body 1 and cannot become accidentally disengaged so long as the said staple 7 is in position shown in full lines in Fig. 3, while there is no projection or obstruction to the perfect action of the pick in its operation. When it is desired to remove the pick or drill point the staple 7 is driven outwardly into position shown in dotted lines in Fig. 3 and is turned so that its short tapered end 12 enters the transverse hole or opening 11 in the pick shank or body 1 and is then driven into said opening. This operation causes the short tapered end 12 of the staple 7 to engage the extreme bottom end of the tapered lug 5 of the pick or drill point 2, and as said staple 7 is driven inwardly and into position shown in Fig. 4 the said tapered lug 5 on the point 2 is forced out of the tapered recess 4 in the shank or body 1 of the pick or drill, so that the said point 2 can be removed by hand without any hammering or other force, which would be necessary to drive or otherwise disengage the tapered lug 5 from the tapered recess 4.

By this construction and arrangement of parts it will be seen that by a very simple and inexpensive construction I provide a means for securing, fastening and holding a pick or drill point in its proper position and at the same time provide a simple and an efficient means for quickly disengaging and removing a pick or drill point from its shank or body.

Having thus fully described the invention what I claim as new and desire to secure by Letters Patent of the United States is—

An implement of the character described comprising a shank or body, a removable point, said shank or body being provided with a tapered recess in its end, said point being provided with a tapered lug to enter said tapered recess, a fastening means on said shank or body, said shank or body and said lug on said point being provided with transverse registering openings to receive said fastening means to hold said tapered lug within said tapered recess, the said shank or body being provided with a transverse opening at the bottom of said tapered lug on said point to receive said fastening means, said fastening means being adapted to engage said tapered lug at the bottom thereof to disengage the same from said tapered recess, substantially as described.

In testimony whereof, I affix my signature, in presence of two witnesses.

WILLIAM J. MUNDY.

Witnesses:
MICHAEL McLAIN,
PETER MUNDY.

Copies of this patent may be obtained for five cents each, by addressing the "Commissioner of Patents, Washington, D. C."